(12) United States Patent
Yokoyama et al.

(10) Patent No.: US 6,540,264 B1
(45) Date of Patent: Apr. 1, 2003

(54) QUICK CONNECTOR FOR PIPING

(75) Inventors: Kazutaka Yokoyama, Saitama (JP); Kazuo Takeuchi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/546,533

(22) Filed: Apr. 10, 2000

(30) Foreign Application Priority Data

Apr. 27, 1999 (JP) ............................................ 11-120549

(51) Int. Cl.$^7$ ................................................ F16L 39/00
(52) U.S. Cl. .................... 285/319; 285/338; 285/344; 285/347; 285/349; 285/350; 285/918; 277/627; 277/650; 277/652; 277/910; 277/935; 277/938; 277/946
(58) Field of Search ................................. 285/319, 918, 285/344, 347, 349, 350, 338; 277/652, 650, 935, 627, 910, 938, 946

(56) References Cited

U.S. PATENT DOCUMENTS

| 2,705,177 A | * | 3/1955 | Waring | |
| 2,906,552 A | * | 9/1959 | White .......................... 277/652 |
| 2,915,349 A | * | 12/1959 | Gomberg ...................... 277/589 |
| 2,924,876 A | * | 2/1960 | Lewis ............................. 29/458 |
| 3,589,750 A | * | 6/1971 | Dunmire ......................... 285/95 |
| 3,799,559 A | * | 3/1974 | Kayser ........................... 277/41 |
| 4,165,622 A | * | 8/1979 | Brown ............................. 64/4 |
| 4,524,995 A | * | 6/1985 | Bartolomew ................... 285/54 |
| 4,627,598 A | * | 12/1986 | Fremy ........................ 251/149.2 |
| 4,687,232 A | * | 8/1987 | Zimmerman ................... 285/31 |
| 4,817,994 A | * | 4/1989 | Bronnert ........................ 285/93 |
| 4,911,406 A | * | 3/1990 | Attwood ....................... 251/148 |
| 4,946,205 A | * | 8/1990 | Washizu ....................... 285/319 |
| 4,993,756 A | * | 2/1991 | Bechu .......................... 285/319 |
| 4,998,740 A | * | 3/1991 | Tellier .......................... 277/205 |
| 5,163,692 A | * | 11/1992 | Schofield et al. ............ 277/153 |
| 5,222,773 A | * | 6/1993 | Boehme ....................... 285/344 |
| 5,324,082 A | * | 6/1994 | McNaughton et al. ......... 285/93 |
| 5,354,106 A | * | 10/1994 | Washizu et al. ............. 285/319 |
| 5,433,183 A | * | 7/1995 | Vansnick ..................... 123/568 |
| 5,730,481 A | * | 3/1998 | Szabo et al. ................. 285/305 |
| 5,740,893 A | * | 4/1998 | Yamamoto .................... 192/45 |
| 6,068,303 A | * | 5/2000 | Hollnagle ..................... 285/319 |
| 6,095,714 A | * | 8/2000 | Spencer ....................... 403/377 |
| 6,186,561 B1 | * | 2/2001 | Kaishio et al. .............. 285/319 |
| 6,250,692 B1 | * | 6/2001 | Ito et al. ...................... 285/319 |
| 6,302,402 B1 | * | 10/2001 | Rynders et al. .............. 277/530 |

FOREIGN PATENT DOCUMENTS

JP         6-28485      4/1994     ........... F16L/37/12

* cited by examiner

Primary Examiner—J. J. Swann
Assistant Examiner—Carlos Lugo
(74) Attorney, Agent, or Firm—Sughrue Mion, PLLC

(57) ABSTRACT

In a quick connector for piping 10 for detachably connecting a male member 12 to a female member 11, an O-ring 15 is interposed between the female member 11 and the male member 12 so as to form a seal therebetween, and the O-ring 15 is subjected to a low-friction treatment so that the O-ring can be moved in a direction of an axis of the quick connector 10 by a pressure of an employed fluid.

1 Claim, 7 Drawing Sheets

LOW – FRICTION
SURFACE TREATMENT

SURFACE COATING OF
LOW – FRICTION AGENT

LOW – FRICTION
MATERIAL – CONTAINING
RUBBER

COATING OF
SURFACE – LUBRICATING
AGENT

QUICK CONNECTOR FOR PIPING

BACKGROUND OF THE INVENTION

1. Field of the Invention

This invention relates to an improved quick connector for piping. A detachable universal joint (coupling) for piping (whose representative examples include a one-touch coupler and a quick coupler) will be referred to as "quick connector in this specification.

2. Description of the Related Art

One known quick connector for piping is disclosed in Japanese Utility Model Unexamined Publication No. Hei. 6-28485 entitled "QUICK CONNECTOR".

FIG. 7 is across-sectional view of the conventional quick connector for piping according to the above publication, and this quick connector for piping 100 serves to detachably connect a male member 102 to a female member 101.

The female member 101 comprises a socket housing 104, in which an O-ring 105, a collar 106 and an O-ring 107 are inserted in this order, and a socket cap 108 in which a retainer 109 is movably received. The socket cap 108 is threaded on the socket housing 104 through a bushing 111.

The male member 102 comprises a pipe-like member, and has a projection 102a formed on an outer surface of an intermediate portion thereof, and this projection 102a is adapted to be fitted in the retainer 109 of the female member 101.

Next, the operation of the quick connector for piping will be described.

FIGS. 8A and 8B are views explanatory of the operation of the conventional quick connector for piping according to the above publication.

In FIG. 8A, the male member 102 is connected to the female member 101 through the O-ring 105. This O-ring 105 serves to prevent a fluid from leaking through a gap between the female member 101 and the male member 102, and those regions (4 regions), indicated by sign X in FIG. 8A, are seal portions.

In FIG. 8B, when the quick connector for piping 100 is mounted on a vibratory body such as a vehicle, the male member 102 is repeatedly moved relative to the female member 101 in the direction of the axis of the quick connector for piping 100 by the vibration as indicated by arrow b1. When the male member 102 thus moves in the axial direction, the male member 102 carries the O-ring 105 in the axial direction. As a result, torsion and a depression develop in the O-ring 105, which can adversely affect the performance of the seal between the female and male members 101 and 102.

SUMMARY OF THE INVENTION

It is therefore an object of this invention to provide a quick connector for piping in which torsion and a depression are prevented from developing in an O-ring, thereby ensuring a high reliability of the quick connector.

The above object has been achieved by a quick connector for piping of the invention for detachably connecting a male member to a female member, wherein an O-ring is interposed between the female member and the male member so as to form a seal therebetween; and the O-ring is subjected to a low-friction treatment so that the O-ring can be moved in a direction of an axis of the quick connector by a pressure of an employed fluid.

The male member is connected to the female member through the O-ring, so that the O-ring forms a seal between the female member and the male member.

The O-ring is subjected to the low-friction treatment so that the O-ring can be moved in the direction of the axis of the quick connector by the pressure of the employed fluid. When the pressure of the employed fluid acts on the O-ring, the O-ring is pressed in one direction (the direction of the axis of the quick connector). The O-ring is subjected to the low-friction treatment, and the pressure of the employed fluid acts on the O-ring, and therefore even when the male member is moved relative to the female member in the axial direction, the male member will not carry the O-ring. Therefore, the O-ring is kept stationary in a predetermined position regardless of the movement of the male member.

DETAILED DESCRIPTION OF THE PREFERRED EMBODIMENTS

A preferred embodiment of the present invention will now be described with reference to the drawings.

Figure 1:
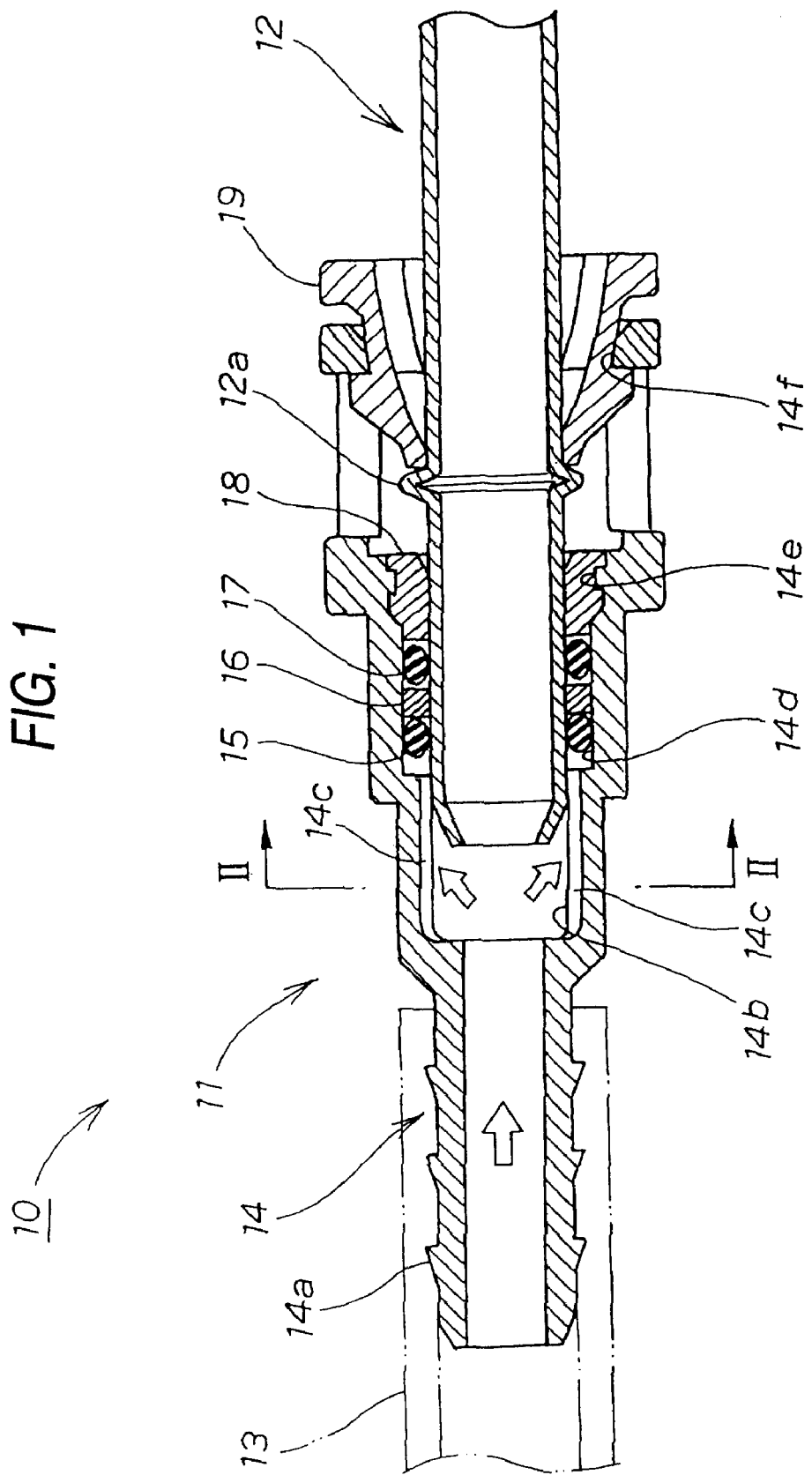
FIG. 1 is a cross-sectional view of a quick connector for piping of the invention.

FIG. 1 is a cross-sectional view of a quick connector for piping of the invention. The quick connector for piping 10 serves to detachably connect a male member 12 to a female member 11. A hose 13 is attached to the female member 11.

The female member 11 comprises a socket housing 14 in which an O-ring 15, a collar 16 and an O-ring 17 are inserted in this order, and a bushing 18 is fitted in the socket housing 14 to retain the O-ring 15, the collar 16 and the O-ring 17 within the socket housing 14. Further, a retainer 19 is slidably fitted in the socket housing 14.

The socket housing 14 includes a hose fitting portion 14a, a male member fitting portion 14b, fluid introducing grooves 14c, an O-ring fitting portion 14d, a bushing fitting portion 14e, and a retainer mounting portion 14f. Void arrows indicate a direction of pressure of a fluid (not shown) employed herein, and this direction is the direction of the axis of the quick connector for piping 10, and the fluid pressure in this direction serves to press the O-ring 15 toward the bushing 18.

The male member 12 comprises a pipe-like member, and has a projection 12a formed on an outer surface of intermediate portion thereof, and this projection 12a is adapted to be engaged with the retainer 19.

Figure 2:
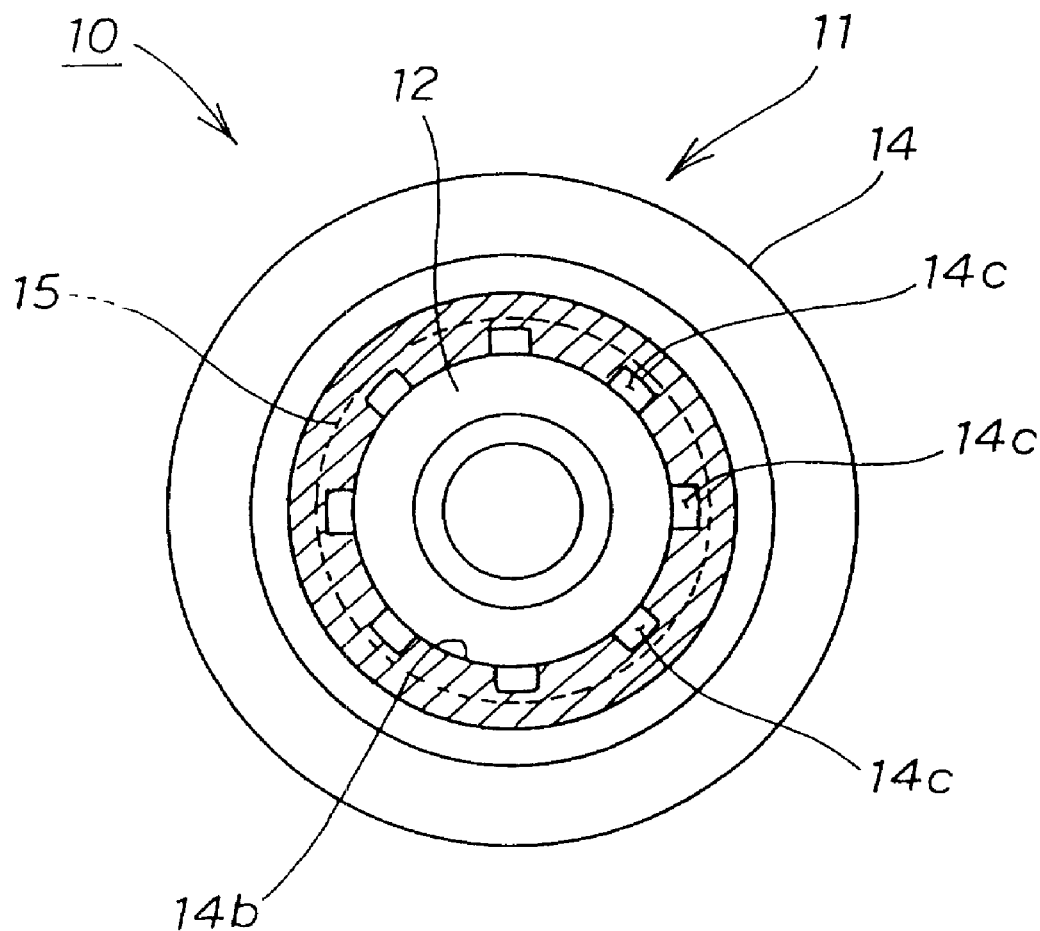
FIG. 2 is a cross-sectional view taken along the line II—II of FIG. 1.

FIG. 2 is a cross-sectional view taken along the line II—II of FIG. 1, showing a cross-sectional shape of the male member fitting portion 14b of the socket housing 14.

The plurality of fluid introducing grooves 14c are radially formed in the male member fitting portion 14b, and these grooves 14c serve to apply the pressure of the employed fluid uniformly to the O-ring 15 over the entire circumference thereof. Since the plurality of fluid introducing grooves 14c are formed in the male member fitting portion 14b, the pressure of the employed fluid can be applied to the O-ring 15 uniformly over the entire circumference thereof. Even if the male member 12 is moved in the direction of the axis of the piping-purpose connector 10, for example, by vibrations, the O-ring 15 is prevented from being partially carried by the male member 12 since the pressure of the employed fluid is applied to this O-ring uniformly over the entire circumference thereof. Therefore, torsion and a depression are prevented from developing in the O-ring 15. Therefore, the good seal is maintained between the female member 11 and the male member 12.

Figure 3:
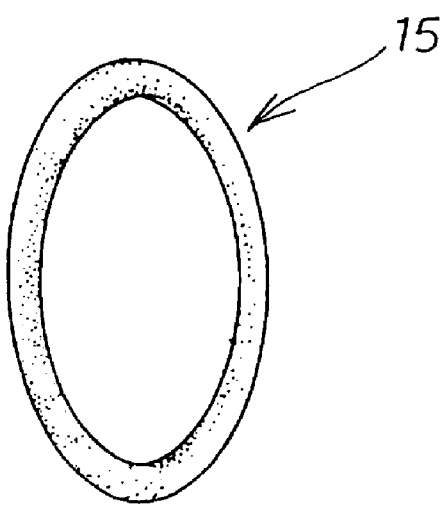
FIG. 3 is a perspective view of an O-ring in the quick connector for piping of the invention.

FIG. 3 is a perspective view of the O-ring used in the quick connector for piping of the invention, and the O-ring 15 is formed into a low-friction design, using a fluororesin, which is one of low-friction treatments.

The O-ring 15 is thus made of a fluororesin, and therefore the friction coefficient $\mu$ of the O-ring 15 is reduced. As described later, the friction coefficient $\mu$ of chloroprene rubber, which is a common material for O-rings, is 1.4 whereas the friction coefficient $\mu$ of the O-ring 15, made of a fluororesin, is 0.5, which indicates that a low-friction treatment has been effected.

The O-ring 17, shown in FIG. 1, is identical to the O-ring 15, and therefore detailed description thereof will be omitted.

Next, the operation of the above quick connector for piping will be described.

FIGS. 4A to 4D are views explanatory of a first operation of the quick connector for piping of the invention. In these Figures, the showing of the collar 16 (see FIG. 1) and the O-ring 17 is omitted.

Figure 4A:
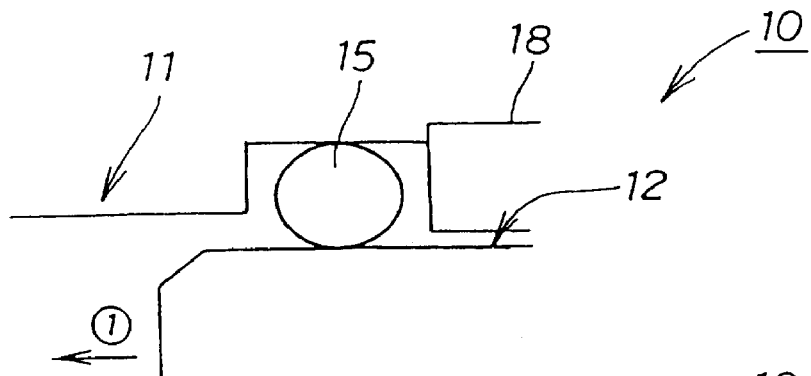
FIGS. 4A to 4D are views explaining a first operation of the quick connector for piping of the invention.

In FIG. 4A, the male member 12 is inserted into the female member 11 as indicated by arrow ①.

Figure 4B:
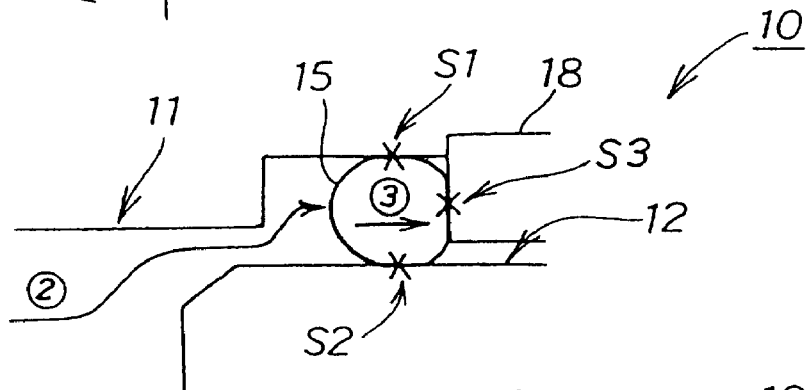

In FIG. 4B, when the pressure of the employed fluid is exerted as indicated by arrow ②, the O-ring 15 is moved toward the bushing 18 as indicated by arrow ③ since the O-ring 15 has been subjected to the low-friction treatment. As a result, the inner surface of the female member 11 and the outer surface of the O-ring 15 cooperate with each other to form a first seal portion S1, and the outer surface of the male member 12 and the inner surface of the O-ring 15 cooperate with each other to form a second seal portion S2, and an end surface of the bushing 18 and the side surface of the O-ring 15 cooperate with each other to form a third seal portion S3.

Figure 4C:
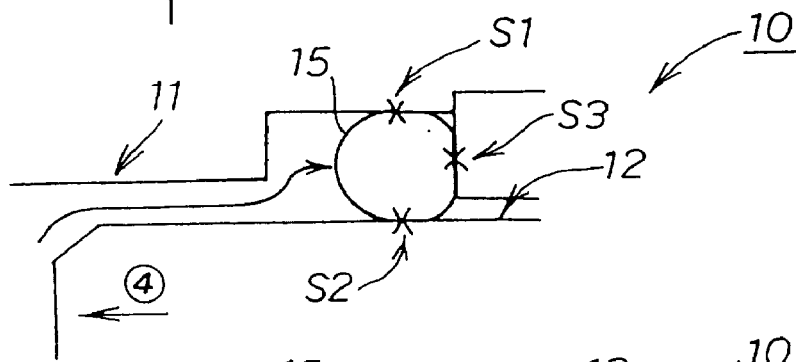

In FIG. 4C, the male member 12 is moved in the direction of the axis of the quick connector for piping 10 as indicated by arrow ④, for example, by vibrations. Generally, when a value, obtained by multiplying the force, applied to the male member 12 from the exterior, by the friction coefficient of the second seal portion S2 (here, this friction coefficient is replaced by the friction coefficient of the O-ring 15, is larger than the force with which the pressure of the employed fluid presses the O-ring 15 toward the bushing 18, the male member 12 carries the O-ring 15. However, when the O-ring 15 is subjected to the low-friction treatment, the O-ring 15 is held in a stationary condition, and only the male member 12 is moved in the direction indicated by arrow ④. Therefore, the male member 12 will not carry the O-ring 15.

Therefore, the sealed condition of the first, second and third seal portions S1, S2 and S3 will not be affected.

Namely, the good seal is maintained between the female and male members 11 and 12 without affecting the sealing ability of the O-ring 15, so that the reliability of the quick connector for piping can be enhanced. And besides, since the male member 12 will not carry the O-ring 15, the lifetime of the O-ring 15 is prolonged.

Figure 4D:
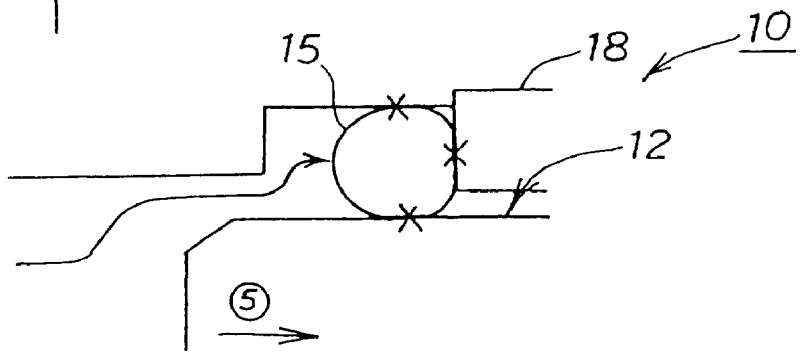

In FIG. 4D, the male member 12 is moved in the direction of the axis of the quick connector 10 as indicated by arrow ⑤, for example, by vibrations. As described above for FIG. 4C, only the male member 12 is moved in the direction indicated by arrow ⑤ while the O-ring 15 is kept stationary. Namely, the male member 12 will not carry the O-ring 15. Therefore, the O-ring 15 will not be pressed toward the bushing 18 with an undue force, and therefore will not be damaged.

Figure 5A:
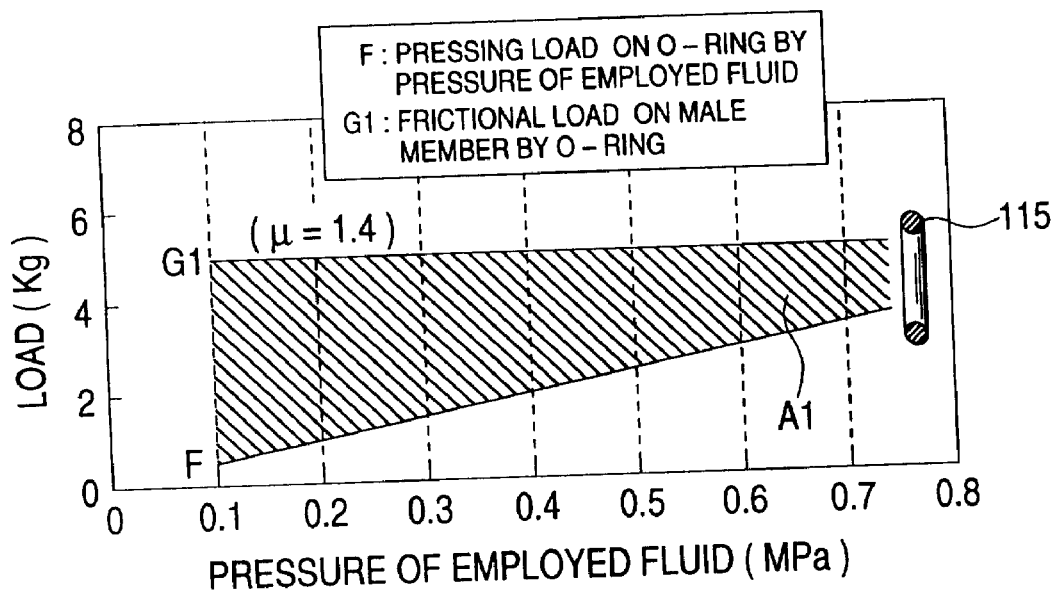
FIGS. 5A and 5B are illustrations explaining a second operation of the quick connector for piping of the invention.
Figure 5B:
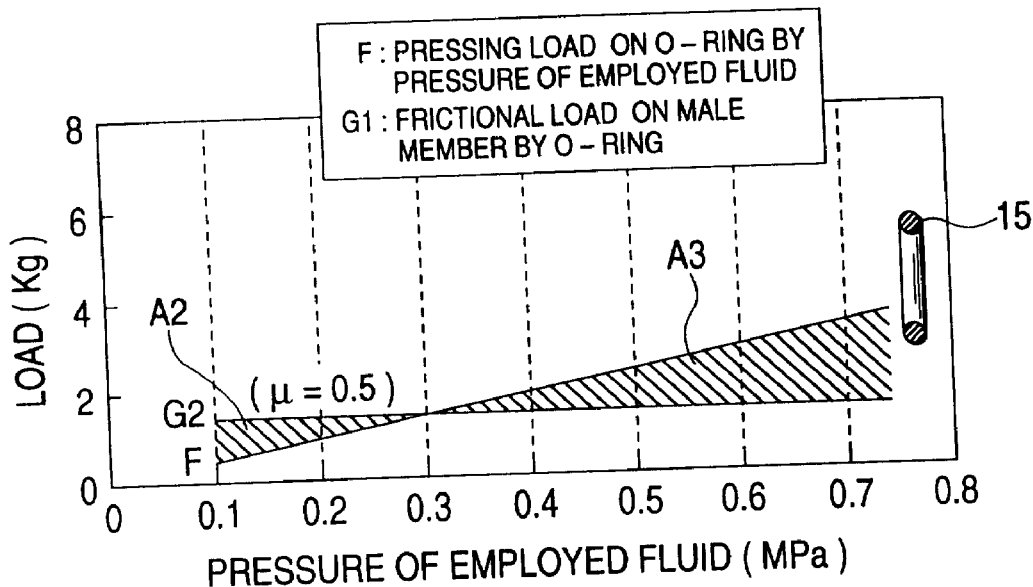

FIGS. 5A and 5B are views showing a second operation of the quick connector for piping of the invention, and FIG. 5A shows a comparative example, and FIG. 5B shows an example of the invention. In FIGS. 5A and 5B, the abscissa axis represents the pressure (MPa) of the employed fluid, and the ordinate axis represents the pressing load (kg) on the O-ring by the pressure of the employed fluid, and the frictional load (kg) on the male member by the O-ring.

In FIG. 5A, an O-ring 115 of the comparative example is made of chloroprene rubber, and the friction coefficient $\mu$ of the O-ring 115, made of chloroprene rubber, is 1.4. Here, G1 represents the frictional load obtained when the O-ring 115 is deformed a predetermined amount, and F represents the pressing load obtained when the pressure of the employed fluid is changed.

The frictional load G1 is the frictional load obtained when the deformation of the predetermined amount is obtained, and therefore this frictional load G1 is constant regardless of the pressure of the employed fluid. The pressing load F increases with the increase with the pressure of the employed fluid, and therefore is proportional thereto.

However, in the case where the O-ring 115 is made of chloroprene rubber, the frictional load G1 is always larger than the pressing load F in the range A1, and therefore the movement of the O-ring 115 by the pressing load F can not be expected.

In FIG. 5B, the O-ring 15 of the invention is made of a fluororesin, and the friction coefficient $\mu$ of the O-ring 15, made of a fluororesin, is 0.5. Here, G2 represents the frictional load obtained when the O-ring 15 is deformed a predetermined amount, and F represents the pressing load obtained when the pressure of the employed fluid is changed.

As described above for FIG. 5A, the frictional load G2 is the frictional load obtained when the deformation of the predetermined amount is obtained, and therefore this frictional load G2 is constant regardless of the pressure of the employed fluid. The pressing load F increases with the increase with the pressure of the employed fluid, and therefore is proportional thereto.

Here, the frictional load G2 is larger than the pressing load F in the range A2, and therefore the movement of the O-ring by the pressing load F can not be expected. However, the pressing load F is larger than the frictional load G2 in the range A3, and therefore the movement of the O-ring by the pressing-load F can be expected.

FIGS. 6A to 6D show other examples of O-rings for use in the quick connector for piping of the invention, showing methods of achieving a low-friction design of the O-ring.

Figure 6A:
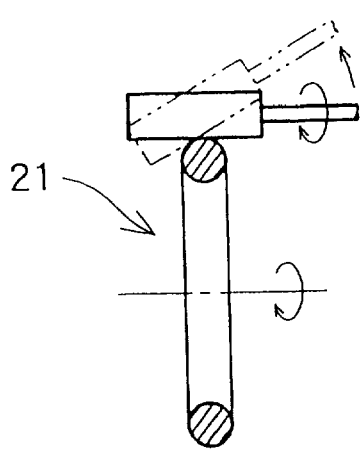
FIGS. 6A to 6D are views showing other examples of O-rings in the quick connector for piping of the invention.

In FIG. 6A, the surface of an O-ring 21 is ground, thereby achieving a low-friction design. This is one example of low-friction treatments.

Figure 6B:
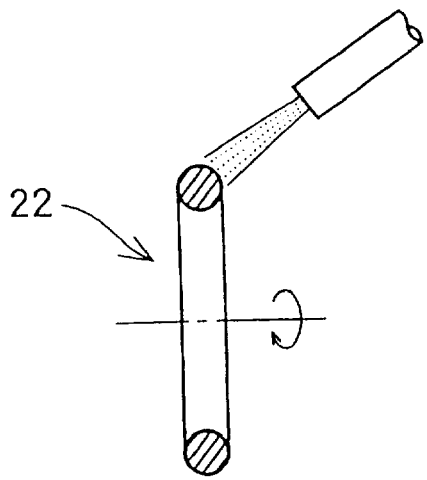

In FIG. 6B, a coating is applied to the surface of an O-ring 22, thereby achieving a low-friction design. This is another example of low-friction treatments. For example, a fluororesin or molybdenum is suitably used as the coating.

Figure 6C:
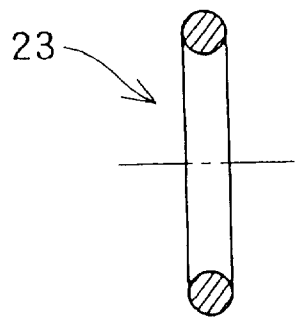

In FIG. 6C, an O-ring 23 is made of low-friction material-containing rubber. Suitable examples of the contained material include grease, oil, molybdenum or a fluororesin.

Figure 6D:
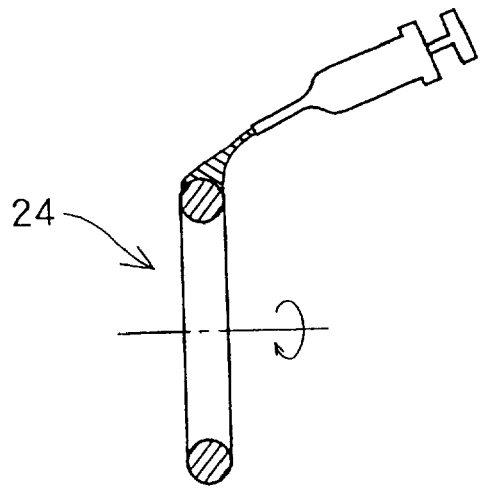
Figure 7:
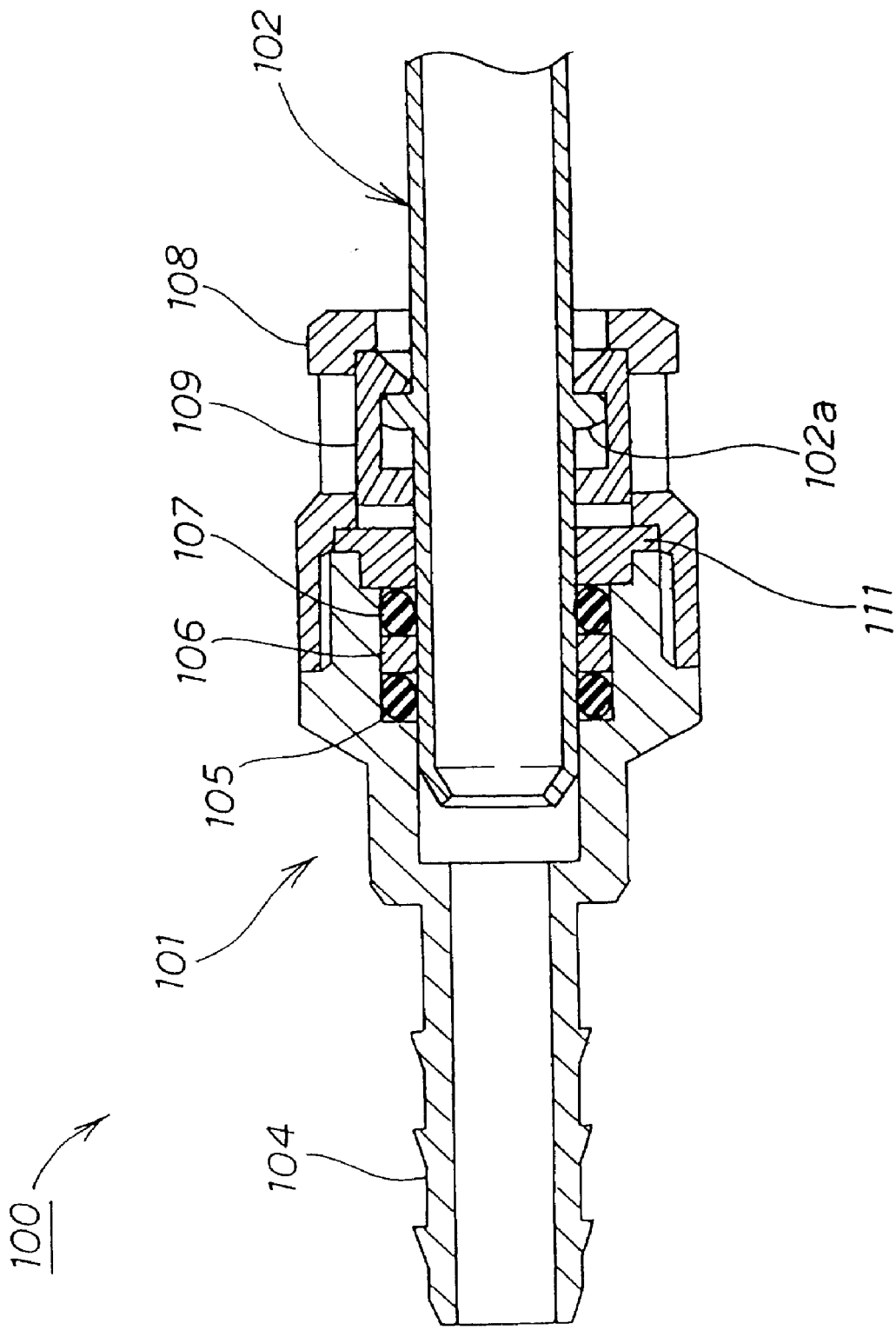
FIG. 7 is a cross-sectional view of a conventional quick connector for piping.
Figure 8A:
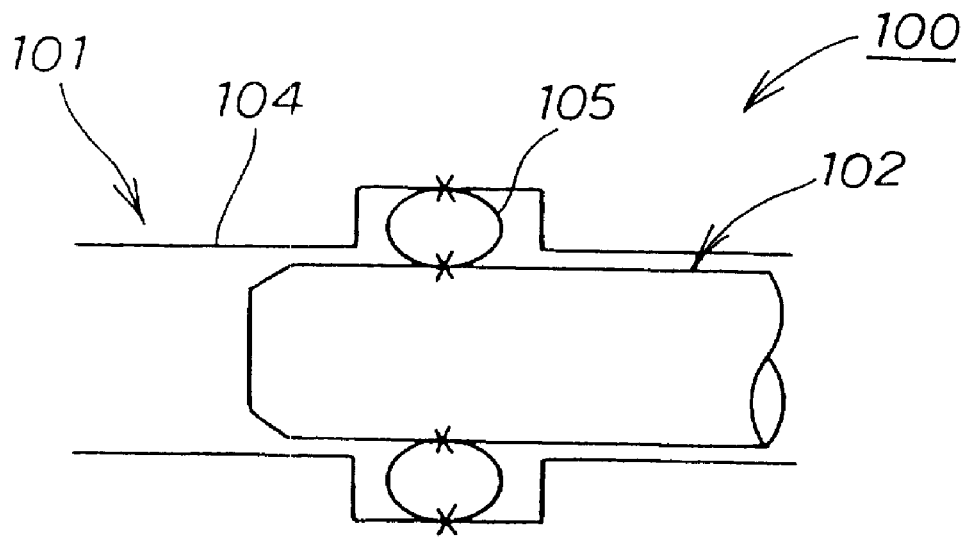
FIGS. 8A and 8B are views explanatory of the conventional quick connector for piping.
Figure 8B:
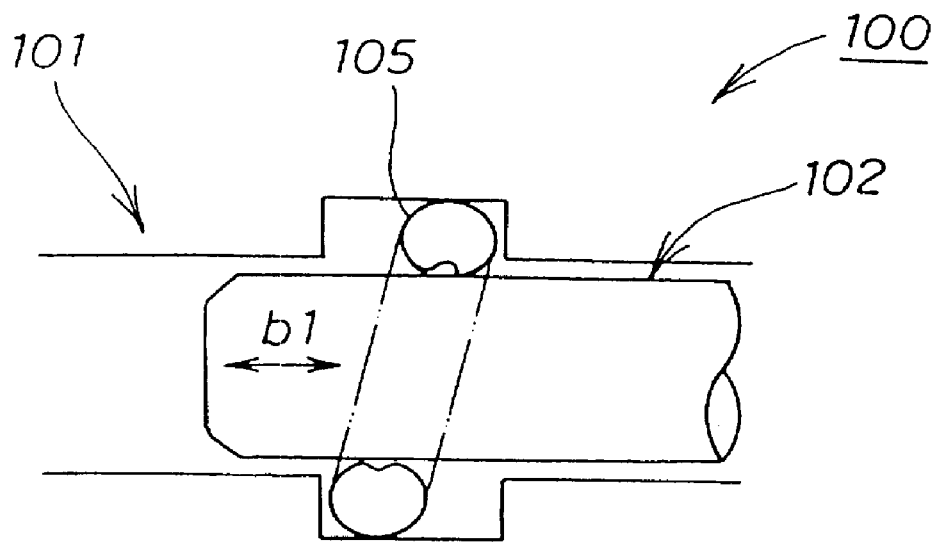

In FIG. 6D, an O-ring 24 is coated with a surface lubricating agent. Examples of the surface lubricating agent include grease and oil, and preferably molybdenum or a fluororesin is contained in the grease or oil.

In the embodiment shown in FIG. 3, although the O-ring 15 is entirely molded of a fluororesin, the invention is not limited to this embodiment, and for example, the O-ring may be molded of a fluorine elastomer in which case the surface of the O-ring is modified so as to achieve a low-friction design.

In the examples of FIGS. 6a to 6D, the various methods of achieving the low-friction design of the O-ring are shown, and these methods of FIGS. 6A to 6D can be used in combination.

In the present invention, the following effects are achieved by the following construction.

In the invention, the male member is connected to the female member through the O-ring, so that the O-ring forms a seal between the female member and the male member. The O-ring is subjected to the low-friction treatment so that the O-ring can be moved in the direction of the axis of the quick connector by the pressure of the employed fluid. When the pressure of the employed fluid acts on the O-ring, the O-ring is pressed in one direction (the direction of the axis of the quick connector).

Therefore even when the male member is moved relative to the female member in the axial direction, the male member will not carry the O-ring. Therefore, the O-ring is kept stationary in the predetermined position relative to the female member. Therefore, the sealing ability of the O-ring will not be adversely affected, and the good seal can be maintained between the female member and the male member, thereby enhancing the reliability of the quick connector for piping. And besides, the lifetime of the O-ring is prolonged since the male member will not carry the O-ring.

What is claimed is:

1. A quick connector for piping comprising:

a female member;

a male member detachably connected to said female member; and an O-ring interposed between said female member and said male member so as to form a seal therebetween, wherein said O-ring has a low-friction surface so that said O-ring can be slid in a direction of an axis of said quick connector by a pressure of an employed fluid, wherein said female member includes an annular male member fitting portion being contactable with a periphery surface of a tip end of said male member, and a plurality of fluid introducing grooves formed in an inner surface of said male member fitting portion at even intervals so that the pressure of the employed fluid is uniformly applied to said O-ring.

* * * * *